Figure 1:
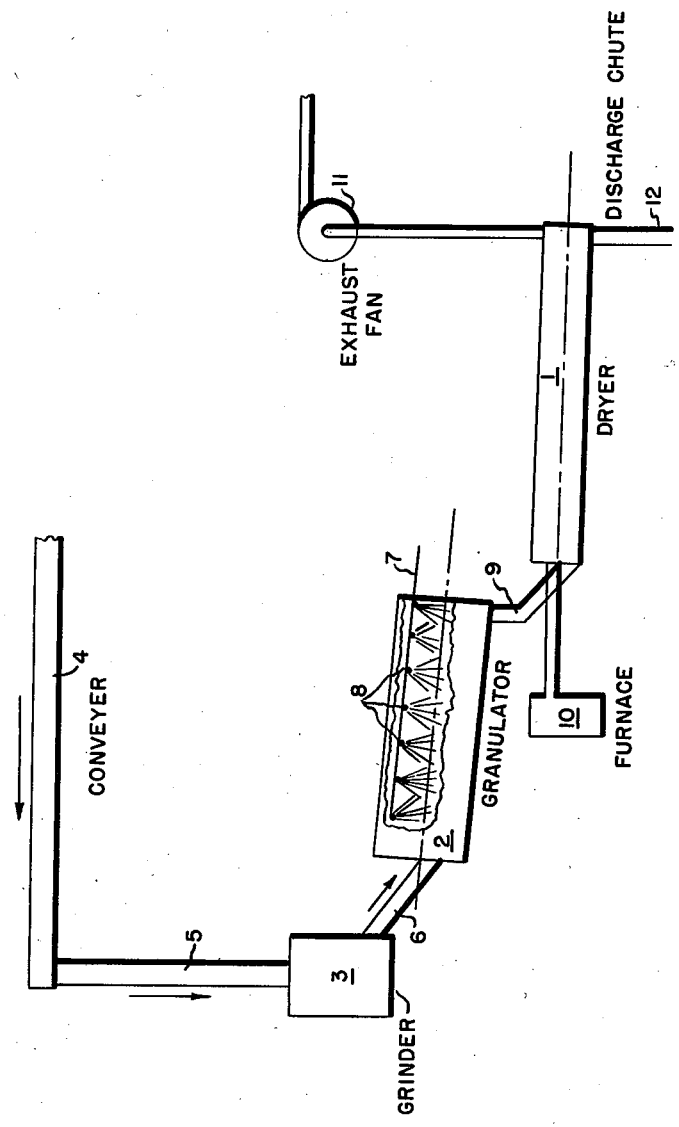

Feb. 26, 1952  A. P. GIRAITIS  2,587,309
GRANULATION OF SALT CAKE
Filed June 14, 1950  3 Sheets-Sheet 1

INVENTOR.
ALBERT P. GIRAITIS
BY *Kenneth Swartwood*

Feb. 26, 1952     A. P. GIRAITIS     2,587,309
GRANULATION OF SALT CAKE
Filed June 14, 1950     3 Sheets-Sheet 3

INVENTOR.
ALBERT P. GIRAITIS
BY Kenneth Swartwood

Patented Feb. 26, 1952

2,587,309

UNITED STATES PATENT OFFICE 2,587,309

GRANULATION OF SALT CAKE

Albert P. Giraitis, Baton Rouge, La., assignor to Ethyl Corporation, New York, N. Y., a corporation of Delaware Application June 14, 1950, Serial No. 168,131

3 Claims. (Cl. 23—313)

This invention relates to the manufacture of commercial sodium sulfate, hereafter referred to by the commonly accepted name of "salt cake." The invention is more specifically directed to providing a new and improved treating process whereby manufactured salt cake is converted to a granulated product which also has the advantages of being non-dusting and free of any tendency to harden or cake. The process comprises the steps of uniformly spraying the salt cake with approximately 10 to 14 weight percent of water based on the salt cake while maintaining the salt cake in an agitated bed of not over five inches thickness, and thereafter drying the salt cake to a total moisture content of less than one-half percent water.

The object of the invention is to provide a process for converting manufactured salt cake to a non-caking and free flowing material. A further object is to provide a salt cake which has virtually no dusting tendency. An additional object is to prevent large amounts of coarse or oversize granules or pellets.

Salt cake as used in industry is obtained from several different sources. In some areas of the United States it is found in naturally occurring deposits. The most extensive source, however, is the manufacture by the reaction of salt and sulfuric acid. In this method, salt and sulfuric acid are combined and reacted according to the following equation:

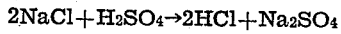

This reaction actually occurs in two steps, the second reaction being a high temperature reaction between sodium bisulfate and salt:

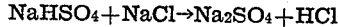

The salt cake produced by this reaction is at an elevated temperature, in the region of 1000° F., upon discharge from the furnace. The salt cake is transported from the furnaces to storage by a system of conveyors, being ground, screened and shipped after storage. The conveyor system includes a cooling section so that the salt cake is stored at only a moderate temperature, in comparison with the furnace discharge temperature, although the initial storage temperature is appreciably above atmospheric conditions.

The principal use of manufactured salt cake is in the production of kraft paper. The requirements of the paper industry are for a salt cake which is non-dusting, has no appreciable quantity of coarse particles, and is permanently free flowing or non-caking. The need for absence of dusts is occasioned by sanitation and health requirements, as well as by the need of avoiding loss of dusts in the paper making process. The need for avoiding large particles or pellets is occasioned by the necessity of dissolving all the salt cake particles within a certain limited time period. The presence of pellets or large particles makes this difficult, and leads to the plugging of spray heads or lines in the paper making process. The need for avoiding caking or hardening arises because of the frequent storage of salt cake for extended periods. Caking or hardening necessitates laborious manual effort to unload or feed salt cake.

Manufactured salt cake has heretofore been unsatisfactory in all three respects. As produced in the furnaces, there are substantial amounts of dust which cause annoyance and losses whenever the salt cake is conveyed, ground or screened, or otherwise handled in a manner permitting the dusts to be released in the air. In addition to the dust in the salt cake as produced by the furnaces, more dust is created in the grinding and screening operation needed for the elimination of pellets and lumps. An additional serious deficiency of manufactured salt cake is its tendency to harden and cake while in storage.

The tendency to cake or harden is frequently so severe that large rock-like masses are formed after storage of a week or more. These masses can be conveniently broken only by hand sledging, which, of course, adds substantially to the manufacturing cost of the salt cake. Occasionally, attempts have been made to circumvent the difficulty by grinding and screening immediately after manufacture and then shipping. This procedure is not satisfactory in that the hardening tendency is not eliminated, but is merely transferred to the consumer. Such immediate shipment is therefore not a solution to the hardening problem. The cause of hardening or caking of manufactured salt cake is not fully understood. It is known that salt cake exists in several crystalline forms, as shown by Kracek and his co-workers, Journal of Physical Chemistry, volume 34, pp. 1741–44 (1930). A previously suggested theory of salt cake hardening is that it is caused by polymorphic crystalline changes of the salt cake during the storage period. It has therefore, been proposed in U. S. Patent 2,374,285 to prevent the caking of salt cake by converting to the Thenardite or $Na_2SO_4$ IV crystalline form, as this is the crystalline form which is stable at ordinary atmospheric temperature.

This prior method has been tested but does not solve the aforementioned difficulties encountered with manufactured salt cake. Although conversion of the salt cake to the stable crystalline form does provide some benefit in reducing the degree or severity of hardening, the results are erratic and provide no assurance of obtaining a free-flowing, non-caking, and non-dusting salt cake. In numerous tests, it has been found that even if the salt cake is mostly in the Thenardite or $Na_2SO_4$ V crystalline form, caking still occurs to such a degree that mechanical handling as a free flowing material is not possible. Conversely, it has been found that heating to elevated temperatures, such that the crystal forms go through several transitions, has no deleterious effect on the freedom from caking tendency. For example, heating a non-caking sample to a temperature of over 365° F., thereby converting the salt cake to the $Na_2SO_4$ III form, and then cooling the sample had no deleterious effect on the free-flowing characteristics.

As heretofore stated, the objects of the invention are to provide a process for converting manufactured salt cake to a uniformly free-flowing and non-caking material, to restrain the formation of large particles, and also to eliminate the objectionable dusting heretofore encountered.

I have now found that caking is associated in large degree with the particle size distribution of salt cake. In particular, it has been found that a salt cake which does not pass a 60 mesh screen will not cake, regardless of crystalline form changes during storage. Particles passing a 60 mesh screen will cake, the caking tendency being most severe for the size fraction passing an 80 mesh screen. (The screens referred to herein are U. S. Standard Screens, the opening dimensions thereof being given in Perry's Chemical Engineer's Handbook, Second Edition, page 1720). Although the fraction of ordinary manufactured salt cake passing a 60 mesh screen cakes hard within a week, the coarser fraction retained by the screen remains free flowing in that period.

I have further found that salt cake which contains 70 percent or more by weight of particles which will not pass a 60 mesh screen will consistently remain in a free flowing condition. In this instance, the presence of the required fraction of larger sized particles counteracts the caking tendency of the fines.

My process accomplishes the selective granulation of salt cake to give the critical proportion of the size between 10 and 60 mesh screen sizes, and also minimizes dusting, but does not result in an excessive amount of coarse particles, i. e., those which will not pass a 10 mesh screen. The salt cake produced by the salt-sulfuric acid process consists ordinarily of from one-half to two-thirds, by weight, of particles passing a 60 mesh screen. By the present process this fines fraction is reduced to below 25 percent and the 10–60 mesh size is increased to over 70 percent, but the formation of larger granules, which will not pass a 10 mesh screen, is minimized.

As heretofore stated, the process comprises the granulation of salt cake by means of spraying with a sufficient quantity of water to provide 10 to 14 weight percent or approximately one mole of water to one mole of salt cake, while maintaining the salt cake in an agitated bed. The sprayed or wetted salt cake is thereafter heated and dried to a total moisture content of less than 0.5 weight percent water.

Figure 2:
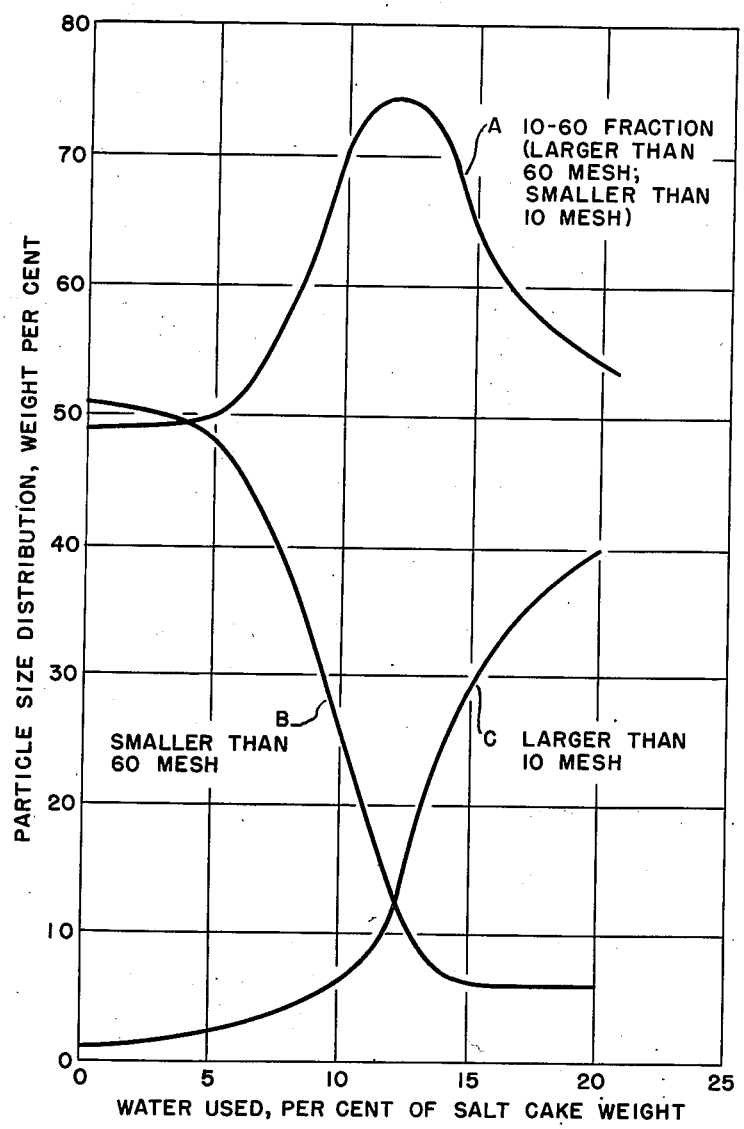
Figure 3:
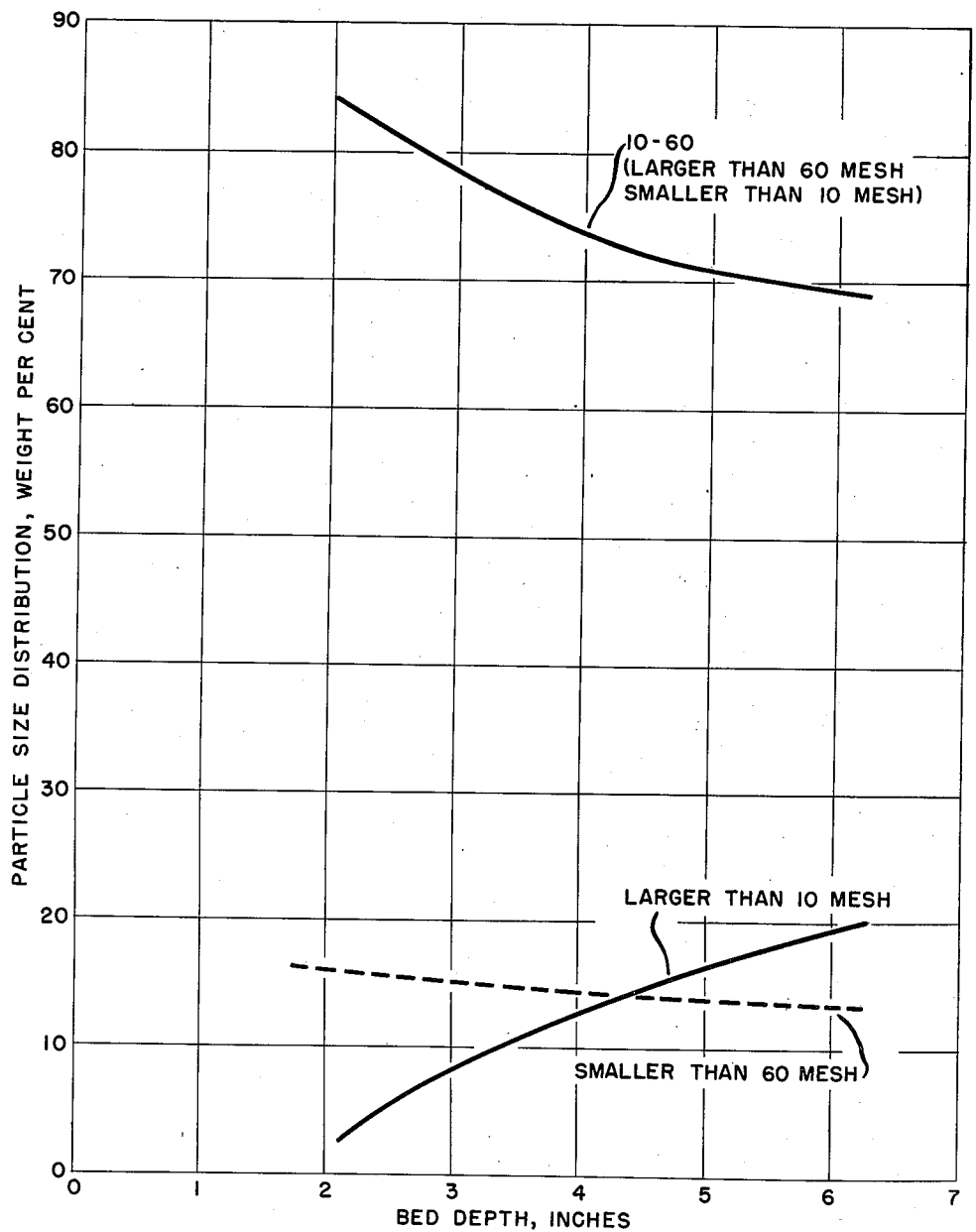

The accompanying figures will allow the process and the results thereof to be more fully and easily understood. Figure 1 is a diagrammatic view of typical apparatus for accomplishing the process, said apparatus including a granulator and a dryer and supplementary equipment. Figure 2 shows a relationship of particle size distribution and the amount of water used in the granulation operation and illustrates the high degree of importance of the critical amount of water in obtaining the objects of the process. Figure 3 is a graphical illustration of the effect of bed depth of the salt cake being granulated.

The apparatus illustrated in Figure 1 is particularly adapted to the embodiment described in the example given hereafter. Referring to Figure 1, the equipment includes a dryer 1 and a granulator 2. The salt cake supply is received through a conveyer 4, which feeds a grinder 3 through chute 5. The ground salt cake is then discharged through chute 6 to the granulator 2. The granulator is an elongated rotating drum slightly inclined to the horizontal. A water line 7 admits water to spray nozzles 8 for uniformly spraying the salt cake during its passage through the granulator. The wet salt cake is discharged through chute 9 to the dryer 1. The dryer is also a rotating cylinder type machine, heat being supplied by combustion gases produced in furnace 10. An exhaust fan 11 removes the hot gases from the furnace. Treated salt cake is discharged from the dryer through chute 12 to storage or shipping operations.

*Example*

As an example of a typical operation, 2000 pounds of salt cake, produced in the customary manner, is received from a producing reaction through conveyer 4, at a temperature of 250° F. The screen analysis of this material, after passing through the grinder 3, is as follows:

| | Weight percent |
|---|---|
| Larger than 10 mesh | 1 |
| 10–60 size | 49 |
| Finer than 60 mesh | 50 |

This material is then fed through chute 6 to granulator 2, wherein the salt cake is maintained at an average bed depth of about 4 inches. Water is fed through line 7 and sprays 8 at the rate of 13 pounds per 100 pounds of salt cake. The salt cake is cooled to about 170° F., and a small amount of water is evaporated during this cooling operation. The granulated salt cake, containing approximately 12 pounds of water per 100 pounds of anhydrous salt cake, is discharged through chute 9 to dryer 1.

In the dryer, the wet granulated salt cake is contacted with hot furnace gases, initially at a temperature of approximately 800° F. The salt cake is dried to a moisture content of less than 0.5 percent, and is discharged through chute 12 at a temperature of approximately 250° F.

The screen analysis of this granulated salt cake is as follows:

| | Weight per cent |
|---|---|
| Larger than 10 mesh | 11 |
| 10–60 size | 75 |
| Finer than 60 mesh | 14 |

Extensive storage tests of the treated product show that it remains non-caking and free-flowing during any practical storage period. For example, salt cake which has been treated by the process, and then stored at rest for a year, has remained free-flowing and non-caking during the entire period. In contrast, untreated salt cake normally cakes hard after storage of from a few days to a week.

In addition to accomplishing conversion of salt cake to a free-flowing product, the process accomplishes the important second objective of eliminating dusting of the product. The handling and conveying of salt cake as ordinarily manufactured is accompanied by a substantial amount of dust blowing, particularly if the operation is in the open or in the presence of air currents. Not only is such dusting a source of annoyance and discomfort to the workmen, but is responsible for appreciable loss of material. As an example of the normal severity of the dusting, in blowing a sample of untreated salt cake with an air stream at a superficial velocity of 1.1 ft. per second for a period of fifteen minutes, 14 percent of the salt cake was lost by carryover in the air stream. In contrast, a sample of granulated salt cake blown under the same conditions does not lose any fine dust in this manner.

The amount of water needed for the granulation operation is approximately one mole per mole of salt cake produced. This proportion of water (corresponding to about 13 pounds per 100 pounds of salt cake), has been discovered to provide the optimum or maximum amount of salt cake in the particle size range which prevents caking. Some variation in water content is permissible, but in order to achieve the desired results, the water must be uniformly added in the range of about 10 to about 14 pounds of water for each 100 pounds of salt cake processed, in order to insure that the product will contain 70 percent or more of a fraction larger than 60 mesh size but smaller than 10 mesh. As already pointed out, this proportion is critical and essential to provide a final non-caking product.

The critical effect of water proportions on the particle size distribution of the finished product is illustrated by Figure 2. This figure gives graphically the results of a series of granulations wherein the amount of water used was varied from below 5 to 18 pounds of water per 100 pounds of salt cake. Curves A, B, and C show the weight percentages of the particle size ranges of importance in the final product. Curve A shows the amount of the desired fraction, that is the fraction passed by a 10 mesh screen but retained by a 60 mesh screen. Curve B shows the amount of particles smaller than 60 mesh size, which is responsible in large degree for the caking of untreated salt cake. Curve C gives the amount of undesired large particles, which are retained on a 10 mesh screen. It will be seen that 70 percent, the necessary amount of the intermediate size fraction, is obtained when the amount of water used is from 10 to 14 pounds per 100 pounds of salt cake. As already described, 70 percent or more of the intermediate size fraction, designated as the 10–60 size, is required to prevent the caking effect of the fine salt cake of less than 60 mesh size.

The spraying or granulation step can be carried out in any convenient apparatus, providing only that the granulation step insures that the water is uniformly added to all the salt cake processed, and that the salt cake is agitated sufficiently so as to provide the agglomeration of the fines to the necessary amount in the 10–60 mesh size. The uniformity of water addition and agglomerative agitation can be provided for in various ways. The preferred method of providing the agitation necessary is by processing the salt cake in a rotating cylinder, the salt cake being maintained in a relatively thin layer or bed. In general, in this type of granulator, a bed depth of less than five inches is preferred. By bed depth is meant the average depth of the salt cake when at rest in the granulator. In other apparatus for carrying out the granulation, an equivalent degree of agitation is easily obtained. An example of another equivalent apparatus is an enclosed ribbon flight conveyer.

Variation in the bed depth of salt cake being treated in a rotating cylinder is accompanied by a variation in the particle size distribution of the final product. However, the size distribution is not extremely sensitive to such bed depth variation. The effect of bed depth is shown in detail in Figure 3. Referring to the figure, the weight percentages of the three size fractions are shown. These curves represent the results that are obtained in granulation with 12 pounds of water per 100 pounds of salt cake, the peripheral speed of the granulator being maintained constant at 3 feet per second.

It will be noted that a bed depth of less than five inches is not absolutely essential but will ensure the necessary 70 percent of the product in the 10 to 60 mesh fraction. Surprisingly, an increase in bed depth increases the coarse fraction, at the expense of the desired 10 to 60 mesh fraction, the amount of fines varying only slightly.

The uniform spraying required by the process presents no particular problem in that a steady flow of both salt cake and water in the proper proportions insures this requirement. Numerous devices are well known in the art for providing a uniform flow of both solids and liquids.

The time required for granulation, or residence time in the granulator, is quite brief. As far as can be determined, the agglomeration takes place immediately upon addition of the water to the salt cake. A residence time of one minute is more than ample in the granulation operation. Longer residence times can be utilized if desired, but there is no advantage therein. A short residence time contributes to the efficiency and capacity of the process.

The preferred discharge temperature of the granulated salt is from 150° to 200° F. The process is not limited to a temperature in this range, however, and lower temperatures can be satisfactorily employed, although the heating load in the subsequent drying operation will be thereby slightly increased. Temperatures above 200° F. are to be avoided, because they indicate that granulation treatment has not been adequate.

The drying operation following the granulation is necessarily carried out under such conditions that the final moisture content of the salt cake is not over 0.5 percent by weight. It has been found that this final moisture level is critical to the success of the process. The presence of 0.5 percent moisture is apparently a threshold amount at which the salt cake begins to be moist to the touch. If over 0.5 percent by weight moisture is allowed to remain in the salt cake, the caking tendency persists. It is believed that the moist condition of the salt cake is evidence of a small amount of solution existent at the surfaces of the salt cake particles. The caking tendency is believed to result from subsequent drying out of such minute quantities of solution accompanied by precipitation of solidified salt cake which acts as cementing connections between the original individual particles, thereby forming a caked mass of interlaced particles.

In order to reduce the moisture content below the critical level of 0.5 percent, the wet granulated salt cake must be heated in the dryer to a temperature of about 200° F. or over. Preferably, the drying operation heats the salt cake to a temperature of approximately 250° F., although higher temperatures can be employed if desired. The salt cake is necessarily agitated during the drying operation, to eliminate the possibility of joining of the individual particles by means of the formation of solid connections between the particles. As shown by the working example above, the drying is advantageously accomplished by passing hot combustion gases in intimate contact with the agitated salt cake in a rotary dryer. Other drying methods are, of course, not precluded, but are less efficient. For example, the heat required for the drying operation can be supplied through a heat transfer surface to the salt cake. It is advantageous to use hot combustion gases to supply heat requirement as well as to sweep out the water vapor formed. A drying period of twenty to forty minutes is usually ample, the drying time not being a critical factor in operation.

Many variations in the process are, of course, possible, the embodiment described herein being only illustrative. The grinding operation prior to the granulation step, shown in the example, is not essential. If desired, the grinding can be omitted. However, due to the variable nature of salt cake produced by the furnaces, a grinding step is desirable to ensure that occasional large lumps are not fed to the granulation step. If desired, the treated salt cake can be screened and then the oversize fraction can be ground and recycled to the granulator. Numerous other variations in embodiments are, of course, possible, subject only to the following claims.

I claim:
1. The process of granulating manufactured salt cake to a free-flowing and non-dusting product comprising uniformly adding to finely divided salt cake a sufficient amount of water to provide a total of 10 to 14 pounds of water per 100 pounds of anhydrous salt cake, and then drying said wetted salt cake to a total moisture content of less than 0.5 percent.

2. The process of granulating manufactured salt cake to a free-flowing and non-dusting product, comprising uniformly spraying finely divided anhydrous salt cake with approximately one mole of water per mole of salt cake while agitating the salt cake, then drying the salt cake to a total moisture content of not over 0.5 percent while continuing the agitation.

3. The process of granulating manufactured salt cake to a free-flowing and non-dusting product comprising uniformly spraying the salt cake with a sufficient amount of water to provide a total of 10 to 14 pounds of water per 100 pounds of anhydrous salt cake, while agitating the salt cake for a period not exceeding one minute in a bed not exceeding five inches in depth, simultaneously cooling the salt cake to a temperature of about 150° F. to about 200° F., then agitating and drying the salt cake to a total moisture content of not over 0.5 percent at a temperature of from about 200 to 250° F.

ALBERT P. GIRAITIS.

REFERENCES CITED

The following references are of record in the file of this patent:

FOREIGN PATENTS

| Number | Country | Date |
| --- | --- | --- |
| 319,413 | Canada | Feb. 2, 1932 |